Dec. 1, 1953 E. A. G. HILL ET AL 2,661,146
MOTOR PUMP UNIT AND COOLING MEANS
Filed May 22, 1950

INVENTORS
EDGAR ALBERT GEORGE HILL
NORMAN KENNETH LOVATT
By Strauch & Hoffman
ATTORNEYS

UNITED STATES PATENT OFFICE 2,661,146

MOTOR PUMP UNIT AND COOLING MEANS

Edgar Albert George Hill, Wembley, and Norman Kenneth Lovatt, St. Albans, England, assignors to Rollnick & Gordon Limited, Wembley, England Application May 22, 1950, Serial No. 163,344
Claims priority, application Great Britain
July 8, 1949

1 Claim. (Cl. 230—117)

This invention relates to vacuum cleaning and like machines with particular reference to the electric motors for operating the same.

In such machines as hitherto proposed or adopted the motor is totally enclosed and insulated from the casing or chamber to which air and dust or other foreign matter is admitted and accordingly it is found that the motor very soon gets over-heated due to lack of proper ventilation.

The object of the present invention is to overcome this disadvantage of existing machines and the invention consists in a machine of the kind referred to in which means are provided for ventilating the motor while still isolating the same from the chamber through which the air and dust or other matter passes.

Further features of the invention will be apparent from the description given hereafter.

The accompanying drawings illustrate one convenient form of motor in accordance with the invention.

Figure 1:
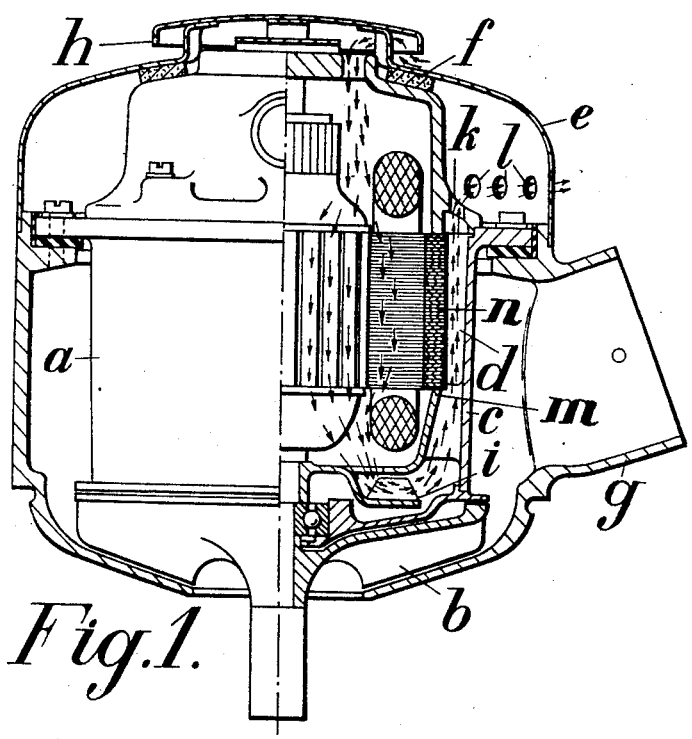
Figure 2:
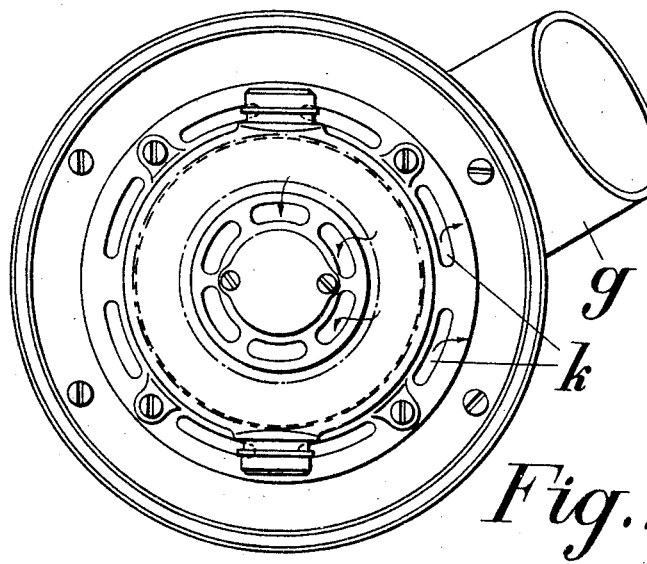

Figure 1 is a sectional elevation, and
Figure 2 is a plan with parts removed.

In carrying our invention into effect in one convenient manner as. for example. in its application to a vacuum cleaning machine, we may form the motor $a$ and impeller $b$ much in the usual manner, the motor being enclosed in a housing $c$ which is spaced somewhat apart from the motor stator so as to leave an annular chamber $d$ through which air may pass to ventilate the motor. Motor housing $c$ has an integral inner wall $m$ which serves to support stator $n$ in addition to defining a portion of annular chamber $d$. The motor housing $c$ is arranged within an outer casing $e$ from which it is insulated by rubber, felt, or like pads $f$, the outer casing forming the air and dust chamber and having a suitable fitting $g$ to which the dust bag may be secured in any suitable manner.

To one end of the outer casing $e$ we secure a dome-like sheet metal or other member $h$ having a grill or other air inlet suitably secured thereto or formed therewith and such inlet is isolated from the interior of the dome member $e$ so that the entering air cannot penetrate thereinto but flows through the motor itself (as indicated by the arrows in Figure 1) and at that end of the motor spindle remote from the inlet we provide a fan or impeller $i$, the blades of which are shaped so that the air is guided into the annular space $d$ between the motor housing and motor stator and thus passes back in a return path to suitable outlets $k$ in the motor housing $c$ and thence to outlets $l$ formed in the abovementioned dome member $e$.

It will thus be seen that the motor is adequately ventilated and kept cool while at the same time being isolated from the air and dust chamber and the disadvantages above referred to with existing machines are completely obviated.

It will be understood that the invention is not to be limited to the precise details of construction hereinbefore given by way of example to describe the nature of the invention and not to limit its scope.

We claim:

In a vacuum cleaner, a casing having inlet and outlet openings, a motor housing within said casing and cooperating with the casing to provide a passage between said openings sealed with respect to the interior of said motor housing, a motor within said housing, an impeller in said casing externally of the motor housing operably connected to said motor, said motor comprising a stator fixed to said housing and a rotor journalled in the housing, means defining a cooling air inlet to the interior of the housing at one end of said rotor, means defining a chamber between the stator and the housing and at least partially surrounding the stator comprising an internal motor housing wall on which said stator is mounted, an opening in said wall at the other end of said rotor, means defining an outlet from said chamber distinct from said passage, and a fan secured to said other end of said rotor within the housing located in said chamber adjacent said opening and operable to draw cooling air through said cooling air inlet and the interior of said motor in one direction and then force it through said chamber in the other direction to said chamber outlet.

EDGAR ALBERT GEORGE HILL.
NORMAN KENNETH LOVATT.

References Cited in the file of this patent

UNITED STATES PATENTS

| Number | Name | Date |
|---|---|---|
| 2,136,247 | Kroenlein | Nov. 8, 1938 |
| 2,187,164 | Leathers | Jan. 16, 1940 |
| 2,309,583 | Frantz | Jan. 26, 1943 |
| 2,321,126 | Breuer | June 8, 1943 |

FOREIGN PATENTS

| Number | Country | Date |
|---|---|---|
| 862,900 | France | Dec. 23, 1940 |